(12) United States Patent  
Palusa et al.

(10) Patent No.: US 9,130,797 B1
(45) Date of Patent: Sep. 8, 2015

(54) PIPELINED DECISION FEEDBACK EQUALIZATION IN AN INTERLEAVED SERIALIZER/DESERIALIZER RECEIVER

(71) Applicant: LSI Corporation, San Jose, CA (US)

(72) Inventors: Chaitanya Palusa, Fremont, CA (US); Volodymyr Shvydun, Los Altos, CA (US); Hiep T. Pham, San Jose, CA (US); Adam B. Healey, Newburyport, MA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/267,568

(22) Filed: May 1, 2014

Related U.S. Application Data

(60) Provisional application No. 61/984,597, filed on Apr. 25, 2014.

(51) Int. Cl.
*H04B 1/38* (2015.01)
*H04L 25/03* (2006.01)

(52) U.S. Cl.
CPC .............................. *H04L 25/03949* (2013.01)

(58) Field of Classification Search
CPC ................. H04L 25/03057; H04L 2025/0349; H04L 2025/03617; H04L 2025/03503; H04L 25/03038
USPC .................................... 375/233, 229, 230, 232
See application file for complete search history.

(56) References Cited

U.S. PATENT DOCUMENTS

| | | | |
|---|---|---|---|
| 8,407,511 | B2 | 3/2013 | Mobin et al. |
| 8,467,440 | B2 | 6/2013 | Aziz et al. |
| 2012/0250753 | A1* | 10/2012 | Zhong .......................... 375/233 |

* cited by examiner

*Primary Examiner* — Zewdu Kassa
(74) *Attorney, Agent, or Firm* — Suiter Swantz pc llo

(57) ABSTRACT

An interleaved track-and-hold front-end with multiphase clocks computes and propagates unrolled decision feedback equalization results along a pipeline with the final outputs selected from one of the interleaved previous output bits with a multiplexer operating over multiple unit intervals instead of one unit interval. An n-way interleaved serializer/deserializer utilizes an n unit interval multiplexer or n one unit interval multiplexers. Pipelined decision feedback equalization allows multiple, slower multiplexers.

20 Claims, 4 Drawing Sheets

PIPELINED DECISION FEEDBACK EQUALIZATION IN AN INTERLEAVED SERIALIZER/DESERIALIZER RECEIVER

PRIORITY

The present application claims the benefit under 35 U.S.C. §119(e) of U.S. Provisional Application Ser. No. 61/984,597, filed Apr. 25, 2014, which is incorporated herein by reference.

BACKGROUND OF THE INVENTION

Equalization inside a serializer/deserializer (SerDes) refers to the correction of inter-symbol interference of the channel. Decision feedback equalization is a common and preferred scheme of equalization inside the serializer/deserializer receivers because it avoids noise and crosstalk enhancement commonly associated with analog equalizers. Decision feedback equalization involves the subtraction of the inter-symbol interference associated with the previous decision from input signal before slicing to get the new decision or bit. Consequently, decision feedback equalization involves feedback with a critical path delay of one unit interval. As the data rates increase and unit intervals decrease, implementing decision feedback equalization becomes challenging. Unrolled decision feedback equalization, in which all the possible outputs are pre-calculated and then the final decision is multiplexed based on the previous bit, also involves a one unit interval critical path for the output multiplexer which still imposes significant challenges at higher data rates. As the data rates approach and exceed 56 Gbps, implementation of a one unit interval multiplexer becomes impractical. Even when practical, the realization of one unit interval multiplexer undesirable due to power consumption.

Consequently, it would be advantageous if an apparatus existed that is suitable for a decision feedback equalization apparatus that spreads out the one unit interval decision feedback equalization multiplexing operation over multiple unit intervals.

SUMMARY OF THE INVENTION

Accordingly, the present invention is directed to a novel method and apparatus for a decision feedback equalization apparatus that spreads out the one unit interval decision feedback equalization multiplexing operation over multiple unit intervals.

In at least one embodiment of the present invention, an interleaved track-and-hold front-end with multiphase clocks computes and propagates unrolled decision feedback equalization results along the pipeline with the final outputs selected from one of the interleaved previous output bits with a multiplexer operating over multiple unit intervals instead of one unit interval.

In another embodiment of the present invention, an n-way interleaved serializer/deserializer utilizes an n unit interval multiplexer. In another embodiment, the serializer/deserializer utilizes n one unit interval multiplexers. Pipelined decision feedback equalization allows multiple, slower multiplexers.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
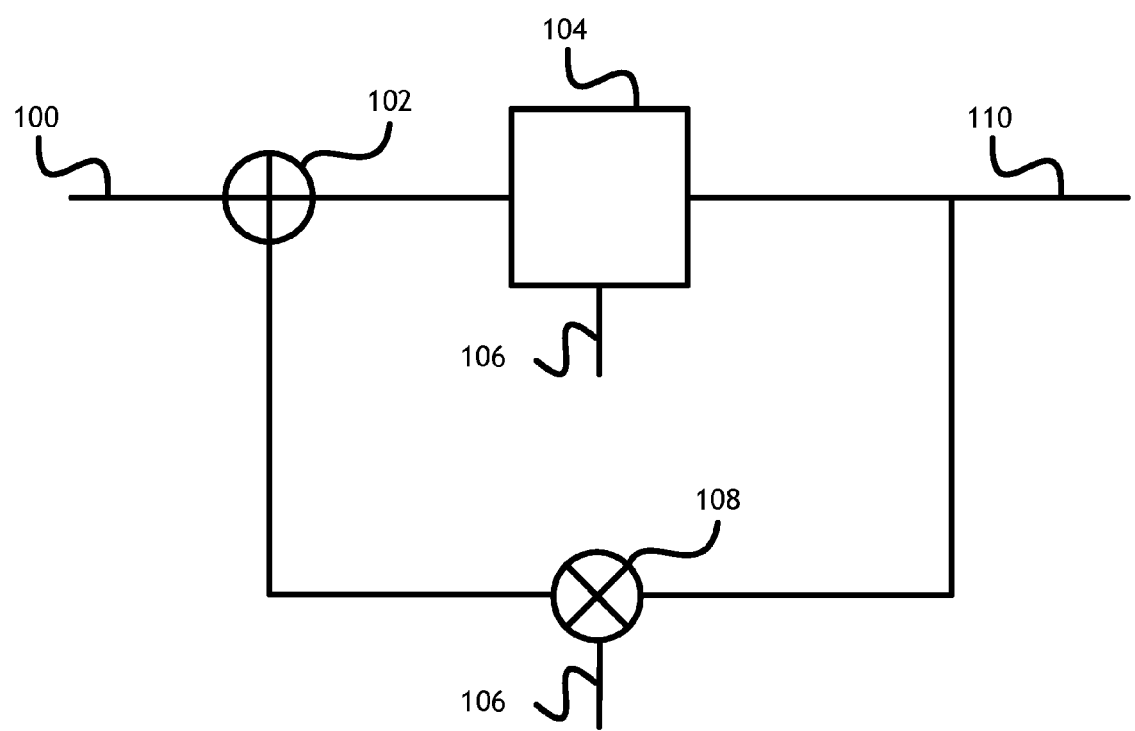
FIG. 1 shows a block diagram of a circuit for decision feedback equalization.

Referring to FIG. 1, a block diagram of a circuit for decision feedback equalization is shown. The circuit receives an input signal pulse 100. The input signal pulse 100 is processed with a slicer 104. The slicer 104 is controlled via clock input 106 to truncate a portion of the input signal pulse 100 corresponding to falling edge of the input pulse signal 100 to produce a decision signal 110. The decision signal 110 is weighted 108 by a first tap coefficient 106 (often denoted h1). The weighted decision signal is then added to the input pulse signal 100 in subsequent iterations for equalization.

Such implementation of decision feedback equalization involves a critical path of one unit interval feedback to the slicer 104. The critical path of one unit interval feedback to the slicer 104 imposes an implementation challenge as speeds increase.

Figure 2:
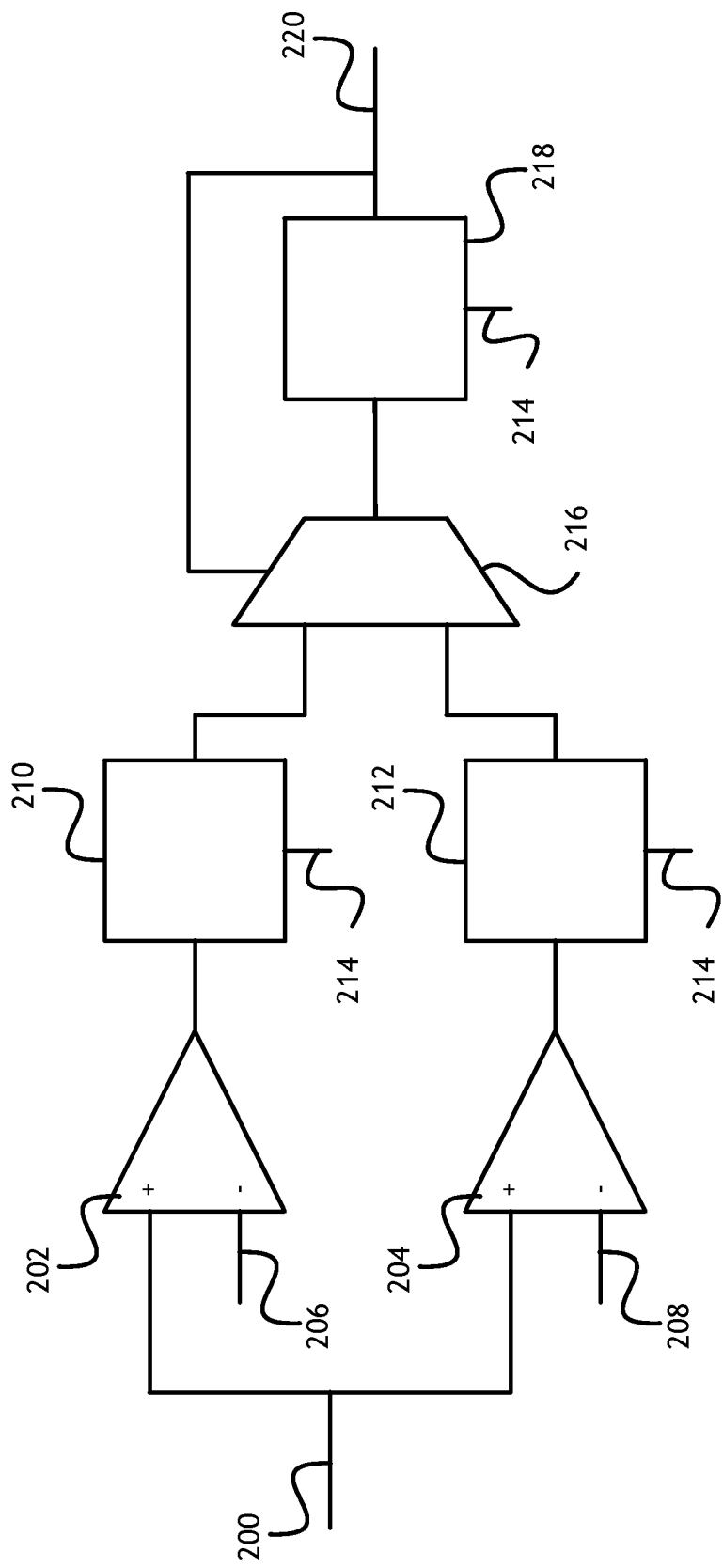
FIG. 2 shows a block diagram of a circuit for unrolled decision feedback equalization having a multiplexer.

Referring to FIG. 2, a block diagram of a circuit for unrolled decision feedback equalization having a multiplexer is shown. An input signal pulse 200 is split to provide inputs to a first comparator 202 and a second comparator 204. The first comparator 202 also receives a positive first tap coefficient 206 and sends the resulting output to first track-and-hold element 210; likewise the second comparator 204 also receives a negative first tap coefficient 208 and sends the resulting output to second track-and-hold element 212. The first track-and-hold element 210 and the second track-and-hold element 212 are controlled by a clock signal 214. Outputs from each of the first track-and-hold element 210 and the second track-and-hold element 212 are delivered to a multiplexer 216 and the output of the multiplexer 216 is fed to a slicer 218 controlled by the clock signal 214. The slicer 218 produces a decision signal 220 which is fed to the multiple 218 produces a decision signal 220 which is fed to the multiplexer 216 to select between the inputs from the first track-and-hold element 210 and the second track-and-hold element 212.

An unrolled decision feedback equalization scheme in which the feedback to the slicer 218 is broken is useful if the one unit interval feedback timing to the slicer 108 is not met. Unrolled decision feedback equalization pre-calculates the outputs based on all the possible values of previous bits and multiplexing 216 the final output based on the actual previous bit. The advantage of the unrolled decision feedback equalization scheme is that the one unit interval feedback to the slicer 218 is broken leading to better timing margins at the slicer. However, unrolled decision feedback equalization is still effectively operating at one unit intervals.

Figure 3:
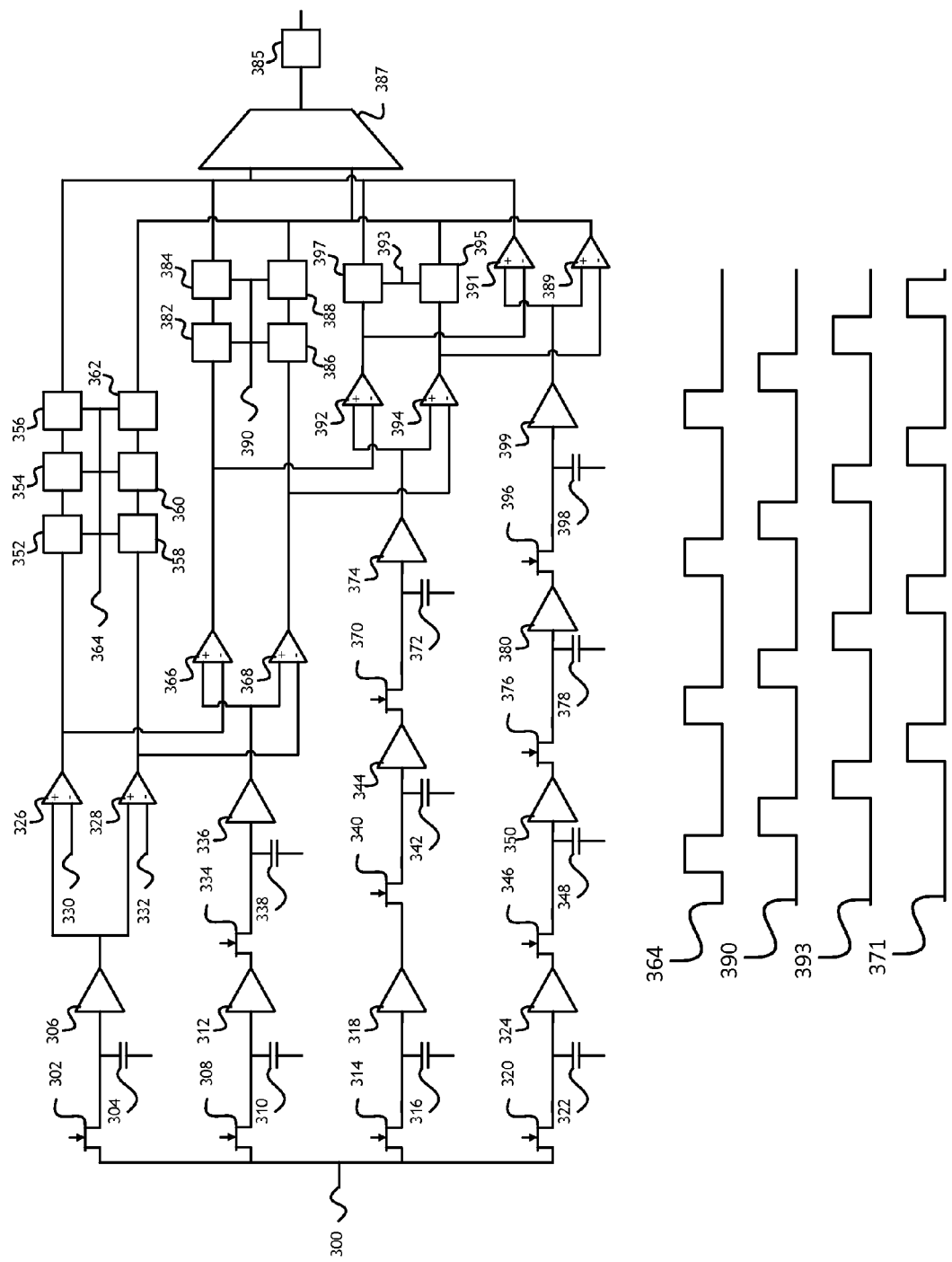
FIG. 3 shows a block diagram of an analog circuit for decision feedback equalization in more than one unit interval.

Referring to FIG. 3, a block diagram of an analog circuit for decision feedback equalization in more than one unit interval is shown. According to at least one embodiment of the present invention, a four-way interleaved track-and-hold structure with each interleaving slice calculating two unrolled decision feedback equalization results. An input pulse signal 300 is received by the source node of a plurality of transistors 302, 308, 314, 320. The drain node of each of the plurality of transistors 302, 308, 314, 320 is connected to a corresponding amplifier 306, 312, 318, 324. Furthermore, the gate node of each of the plurality of transistors 302, 308, 314, 320 is connected to a clock signal such that the first transistor 302 is driven by a first clock signal 364, the second transistor 308 is driven by a second clock signal 390, the third transistor 314 is driven by a third clock signal 393 and the fourth transistor 320 is driven by a fourth clock signal 371.

The output from a first amplifier 306 is fed to inputs of a first comparator 326 and a second comparator 328. The first comparator 326 also receives a negative first tap coefficient 330 and the second comparator 328 also receives a positive first tap coefficient 332. Each of the first comparator 326 and the second comparator 328 are driven by the first clock signal 364. The output from the first comparator 326 is fed through a series of track-and-hold elements 352, 354, 356, each of which is driven by the first clock signal 364. Likewise, the output from the second comparator 328 is fed through a series of track-and-hold elements 358, 360, 362, each of which is driven by the first clock signal 364.

The output from a second amplifier 312 is fed to the source node of a second amplifier transistor 334. The second amplifier transistor 334 is driven by the first clock signal 364 connected to the gate node with the source node connected a third amplifier 336. The output from the third amplifier 336 is fed to inputs of a third comparator 366 and a fourth comparator 368. The third comparator 366 also receives the output from the first comparator 326, scaled by the first tap coefficient and the fourth comparator 368 also receives the output from the second comparator 328, scaled by the first tap coefficient. Each of the third comparator 366 and the fourth comparator 368 are driven by the first clock signal 364. The output from the third comparator 366 is fed through a series of track-and-hold elements 382, 384, each of which is driven by the first clock signal 364. Likewise, the output from the fourth comparator 368 is fed through a series of track-and-hold elements 386, 388, each of which is driven by the first clock signal 364.

The output from a fourth amplifier 318 is fed to the source node of a fourth amplifier transistor 340. The fourth amplifier transistor 340 is driven by the second clock signal 390 connected to the gate node with the source node connected a fifth amplifier 344. The output from a fifth amplifier 344 is fed to the source node of a fifth amplifier transistor 370. The fifth amplifier transistor 370 is driven by the first clock signal 364 connected to the gate node with the source node connected a sixth amplifier 374. The output from the sixth amplifier 374 is fed to inputs of a fifth comparator 392 and a sixth comparator 394. The fifth comparator 392 also receives the output from the third comparator 366, scaled by the first tap coefficient and the sixth comparator 394 also receives the output from the fourth comparator 368, scaled by the first tap coefficient. Each of the fifth comparator 392 and the sixth comparator 394 are driven by the first clock signal 364. The output from the fifth comparator 392 is fed through a track-and-hold element 397 driven by the first clock signal 364. Likewise, the output from the sixth comparator 394 is fed through a track-and-hold element 395 driven by the first clock signal 364.

The output from a seventh amplifier 324 is fed to the source node of a seventh amplifier transistor 346. The seventh amplifier transistor 346 is driven by the second clock signal 390 connected to the gate node with the source node connected a ninth amplifier 380. The output from an eighth amplifier 350 is fed to the source node of an eighth amplifier transistor 376. The eighth amplifier transistor 376 is driven by the second clock signal 390 connected to the gate node with the source node connected a ninth amplifier 380. The output from a ninth amplifier 380 is fed to the source node of a ninth amplifier transistor 396. The ninth amplifier transistor 396 is driven by the first clock signal 364 connected to the gate node with the source node connected a tenth amplifier 399. The output from the tenth amplifier 399 is fed to inputs of a seventh comparator 391 and an eighth comparator 389. The seventh comparator 391 also receives the output from the fifth comparator 326, scaled by the first tap coefficient and the eighth comparator 389 also receives the output from the sixth comparator 328, scaled by the first tap coefficient. Each of the seventh comparator 391 and the eighth comparator 389 are driven by the first clock signal 364.

A multiplexer 387 receives the combined signals from the series of track-and-hold elements 352, 354, 356 connected to the first comparator 326, the series of track-and-hold elements 382, 384 connected to the third comparator 366, the track-and-hold element 397 connected to the fifth comparator 392 and the seventh comparator 391 at a first node. The multiplexer 387 also receives the combined signals from the series of track-and-hold elements 358, 360, 362 connected to the second comparator 328, the series of track-and-hold elements 386, 388 connected to the fourth comparator 368, the track-and-hold element 395 connected to the sixth comparator 394 and the eighth comparator 389 at a second node. The output of the multiplexer 387 is delivered to a slicer 385, and the last output from the slicer 385 drives the multiplexer 387.

A person skilled in the art may appreciate that embodiments of the present invention also include a voltage control capacitor 304, 310, 316, 322, 338, 342, 348, 372, 378, 398 associated with each amplifier 306, 312, 318, 324, 336, 344, 350, 374, 380, 399.

The unrolled decision feedback equalization values are propagated along the pipeline in such a way that final decisions are postponed and selected from the previous bit of one of the slices with the multiplexer 387 that only has to run at four unit intervals. While the present example describes a system operating in four unit intervals, a person skilled in the art may appreciate that other unit intervals are possible by adding track-and-hold elements 352, 354, 356, 358, 360, 362, 382, 384, 386, 388, 397, 395 at the final stage of each pipeline and an additional pipeline having additional amplifiers. A circuit operating in n unit intervals is thereby envisioned.

The track-and-hold front-end with n-way interleaving ensures that each of the input slicers has relaxed timing as they sample a signal that is held stable for n unit intervals. The present embodiment utilizes multiple stages of track-and-hold for each successive interleaving slice to postpone the computation of the unrolled decision feedback equalization results so the unrolled decision feedback equalization outputs of all the slices are re-timed to a single clock domain that has a frequency which is one fourth the data rate of the serializer/deserializer. The unique benefit of this embodiment is that there is no necessity of multiplexers running at one unit interval and instead the final stage multiplexing is done with n unit interval multiplexers for the n-way interleaving structure. In at least one exemplary embodiment, multiphase clocks are utilized. Such multiphase clocks exist naturally in an interleaved track-and-hold front-end.

Figure 4:
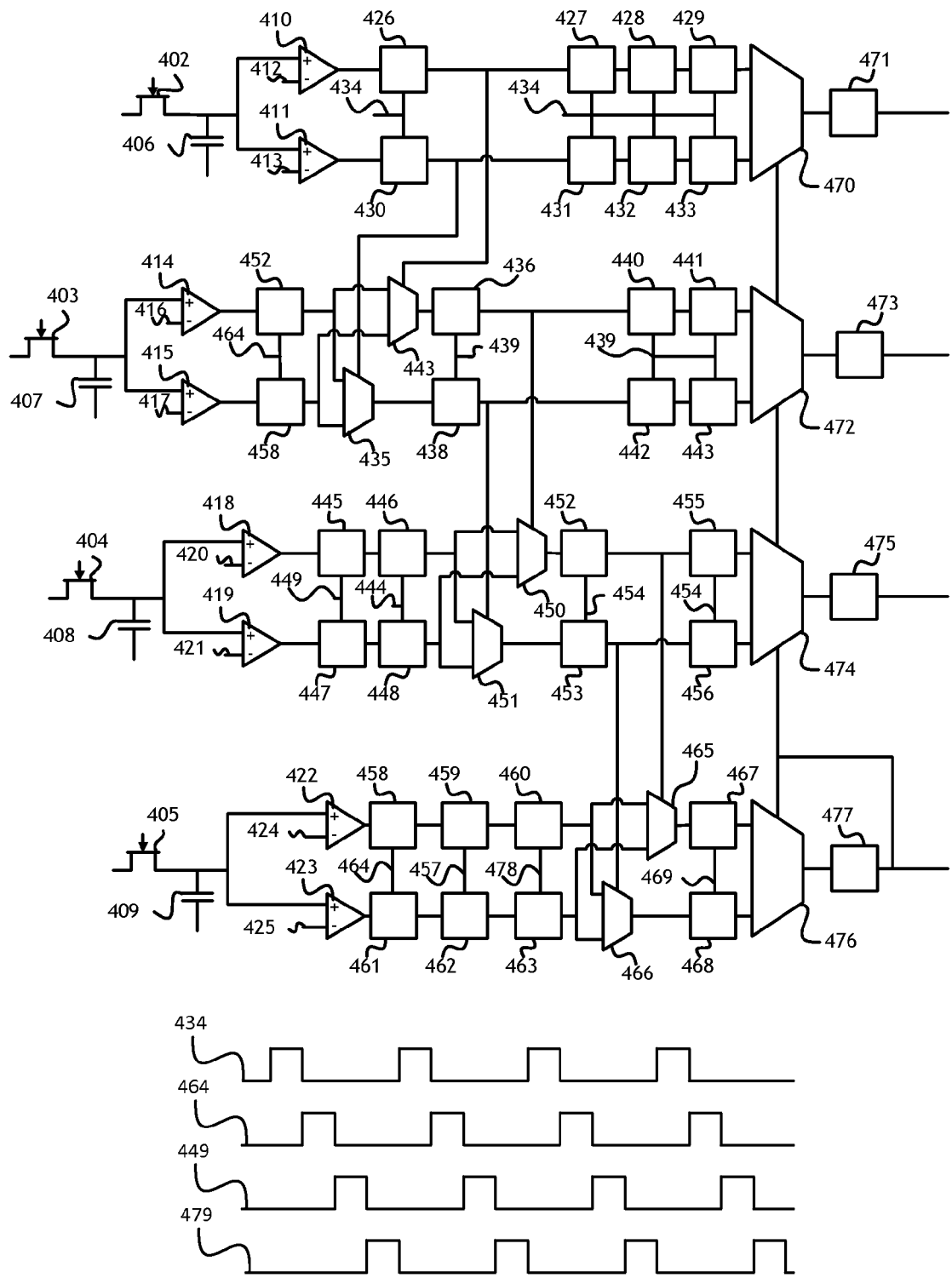
FIG. 4 shows a block diagram of a digital circuit for decision feedback equalization in more than one unit interval.

Referring to FIG. 4, a block diagram of a digital circuit for decision feedback equalization in more than one unit interval is shown. An input pulse signal is received by the source node of a plurality of transistors 402, 403, 404, 405. The drain node of each of the plurality of transistors 402, 403, 404, 405 is connected to corresponding comparators 410, 411, 414, 415, 418, 419, 422, 423. Furthermore, the gate node of each of the plurality of transistors 402, 403, 404, 405 is connected to a clock signal such that the first transistor 402 is driven by a first clock signal, the second transistor 403 is driven by a second clock signal, the third transistor 404 is driven by a third clock signal and the fourth transistor 405 is driven by a fourth clock signal.

The drain from a first transistor 402 is fed to inputs of a first comparator 410 and a second comparator 411. The first comparator 410 also receives a negative first tap coefficient 412 and the second comparator 411 also receives a positive first tap coefficient 413. The output from the first comparator 410 is fed through a pre-branch track-and-hold element 426 and a series of post-branch track-and-hold elements 427, 428, 429 each of which is driven by the first clock signal 434. Likewise, the output from the second comparator 328 is fed through a pre-branch track-and-hold element 430 and a series of post-branch track-and-hold elements 431, 432, 433, each of which is driven by the first clock signal 434. The outputs from the post-branch track-and-hold elements 427, 428, 429 associated with the first comparator 410 are fed into a first input of a first pipeline multiplexer 470. The outputs from the post-branch track-and-hold elements 431, 432, 433 associated with the second comparator 411 are fed into a second input of the first pipeline multiplexer 470. The output from the first pipeline multiplexer 470 is fed into a slicer 471.

The drain from a second transistor 403 is fed to inputs of a third comparator 414 and a fourth comparator 415. The third comparator 414 also receives a negative first tap coefficient 416 and the fourth comparator 415 also receives a positive first tap coefficient 417. The output from the third comparator 414 is fed through a pre-multiplex track-and-hold element 452 driven by a second clock signal 464, and from the pre-multiplex track-and-hold element 452 to a first multiplexer 443 and a second multiplexer 435. Likewise, the output from the fourth comparator 414 is fed through a pre-multiplex track-and-hold element 458 driven by the second clock signal 464, and from the pre-multiplex track-and-hold element 458 to the first multiplexer 443 and the second multiplexer 435. The first multiplexer 443 is driven by a signal from the pre-branch track-and-hold element 426 associated with the first comparator 410. The output of the first multiplexer 443 is fed to a pre-branch track-and-hold element 436 and a series of post branch track-and-hold elements 440, 441, each of which is driven by the first clock signal 434. Likewise, the output of the second multiplexer 435 is fed to a pre-branch track-and-hold element 438 and a series of post branch track-and-hold elements 442, 443, each of which is driven by the first clock signal 434. The outputs from the post-branch track-and-hold elements 440 441 associated with the first multiplexer 443 are fed into a first input of a second pipeline multiplexer 472. The outputs from the post-branch track-and-hold elements 442, 443 associated with the second multiplexer 435 are fed into a second input of the second pipeline multiplexer 472. The output from the second pipeline multiplexer 472 is fed into a slicer 473.

The drain from a third transistor 404 is fed to inputs of a fifth comparator 418 and a sixth comparator 419. The fifth comparator 418 also receives a negative first tap coefficient 420 and the sixth comparator 419 also receives a positive first tap coefficient 421. The output from the fifth comparator 418 is fed through a first pre-multiplex track-and-hold element 445 driven by a third clock signal 449 and then through a second pre-multiplex track-and-hold element 446 driven by a second clock signal 464, and from the second pre-multiplex track-and-hold element 446 to a third multiplexer 450 and a fourth multiplexer 451. Likewise, the output from the fourth comparator 414 is fed through a first pre-multiplex track-and-hold element 447 driven by a third clock signal 449 and then through a second pre-multiplex track-and-hold element 448 driven by a second clock signal 464, and from the second pre-multiplex track-and-hold element 448 to the third multiplexer 450 and the fourth multiplexer 451. The third multiplexer 450 is driven by a signal from the pre-branch track-and-hold element 436 associated with the first multiplexer 443. The output of the third multiplexer 450 is fed to a pre-branch track-and-hold element 452 and a post branch track-and-hold element 455, each of which is driven by the first clock signal 434. Likewise, the fourth multiplexer 451 is driven by a signal from the pre-branch track-and-hold element 438 associated with the second multiplexer 435. The output of the fourth multiplexer 451 is fed to a pre-branch track-and-hold element 453 and a post branch track-and-hold element 449, each of which is driven by the first clock signal 434. The outputs from the post-branch track-and-hold element 455 associated with the third multiplexer 450 is fed into a first input of a third pipeline multiplexer 474. The outputs from the post-branch track-and-hold element 456 associated with the fourth multiplexer 451 is fed into a second input of the third pipeline multiplexer 474. The output from the third pipeline multiplexer 474 is fed into a slicer 475.

The drain from a fourth transistor 405 is fed to inputs of a seventh comparator 422 and an eighth comparator 423. The seventh comparator 422 also receives a negative first tap coefficient 424 and the eighth comparator 423 also receives a positive first tap coefficient 425. The output from the seventh comparator 422 is fed through a first pre-multiplex track-and-hold element 458 driven by a fourth clock signal 479, then a second pre-multiplex track-and-hold element 459 driven by a third clock signal 449 and then through a third pre-multiplex track-and-hold element 460 driven by a second clock signal 464, and from the third pre-multiplex track-and-hold element 460 to a fifth multiplexer 465 and a sixth multiplexer 466. Likewise, the output from the fourth comparator 414 is fed through a first pre-multiplex track-and-hold element 461 driven by a fourth clock signal 479, then a second pre-multiplex track-and-hold element 462 driven by a third clock signal 449 and then through a third pre-multiplex track-and-hold element 463 driven by a second clock signal 464, and from the third pre-multiplex track-and-hold element 463 to the fifth multiplexer 465 and the sixth multiplexer 466. The fifth multiplexer 465 is driven by a signal from the pre-branch track-and-hold element 452 associated with the third multiplexer 450. The output of the fifth multiplexer 465 is fed to a track-and-hold element 467 driven by the first clock signal 434. Likewise, the sixth multiplexer 466 is driven by a signal from the pre-branch track-and-hold element 453 associated with the fourth multiplexer 451. The output of the sixth multiplexer 466 is fed to a track-and-hold element 468 driven by the first clock signal 434. The output from the track-and-hold element 467 associated with the fifth multiplexer 465 is fed into a first input of a fourth pipeline multiplexer 476. The outputs from the track-and-hold element 468 associated with the sixth multiplexer 466 is fed into a second input of the fourth pipeline multiplexer 476. The output from the fourth pipeline multiplexer 476 is fed into a slicer 477 and the output of the slicer 477 controls the output selection in the first pipeline multiplexer 470, the second pipeline multiplexer 472, the third pipeline multiplexer 474 and the fourth pipeline multiplexer 476.

A person skilled in the art may appreciate that embodiments of the present invention also include voltage control capacitors 406, 407, 408, 409 associated with each set of comparators 410, 411, 414, 415, 418, 419, 422, 423.

The embodiments described herein specifically relate to 1-tap decision feedback equalization; however, a person skilled in the art may appreciate that similar embodiments can be extended for n-tap decision feedback equalization as well. Additional hardware for n-tap decision feedback equalization may be required, but the advantage of a serial or a staggered interleaving scheme is such that hardware increases linearly with additional decision feedback equalization as opposed to exponential increase in the case of parallel implementation.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A signal processing apparatus comprising:
   a first signal pipeline comprising:
      a first comparator;
      a second comparator;
      a first track-and-hold element configured to receive the output from the first comparator, the first track-and-hold element configured to be driven by a first clock signal;
      a second track-and-hold element configured to receive the output from the second comparator, the second track-and-hold element configured to be driven by the first clock signal;
      a third track-and-hold element configured to receive the output from the first track-and-hold element; and
      a fourth track-and-hold element configured to receive the output from the second track-and-hold element; and
   a second signal pipeline comprising:
      a first comparator;
      a second comparator;
      a first track-and-hold element configured to receive the output from the first comparator, the first track-and-hold element configured to be driven by a second clock signal; and
      a second track-and-hold element configured to receive the output from the second comparator, the second track-and-hold element configured to be driven by the second clock signal; and
   a first multiplexer configured to produce one or more feedback equalized bits.

2. The signal processing apparatus of claim 1, wherein:
   the first comparator of the second signal pipeline is configured to receive the output from the first comparator of the first signal pipeline; and
   the second comparator of the second signal pipeline is configured to receive the output from the second comparator of the first signal pipeline.

3. The signal processing apparatus of claim 2, wherein:
   the output from the first comparator of the first signal pipeline is scaled by a tap coefficient before it is received by the first comparator of the second signal pipeline; and
   the output from the second comparator of the first signal pipeline is scaled by a tap coefficient before it is received by the second comparator of the second signal pipeline.

4. The signal processing apparatus of claim 2, further comprising:
   a third signal pipeline comprising:
      a first comparator;
      a second comparator;
      a first track-and-hold element configured to receive the output from the first comparator, the first track-and-hold element configured to be driven by a third clock signal; and
      a second track-and-hold element configured to receive the output from the second comparator, the second track-and-hold element configured to be driven by the third clock signal,
   wherein:
      the first signal pipeline further comprises:
         a fifth track-and-hold element configured to receive the output from the third track-and-hold element; and
         a sixth track-and-hold element configured to receive the output from the fourth track-and-hold element;
      the second signal pipeline further comprises:
         a third track-and-hold element configured to receive the output from the first track-and-hold element; and
         a fourth track-and-hold element configured to receive the output from the second track-and-hold element.

5. The signal processing apparatus of claim 4, wherein:
   the first comparator of the third signal pipeline is configured to receive the output from the first comparator of the second signal pipeline; and
   the second comparator of the third signal pipeline is configured to receive the output from the second comparator of the second signal pipeline.

6. The signal processing apparatus of claim 5, wherein the first clock signal, the second clock signal and the third clock signal are substantially similar.

7. The signal processing apparatus of claim 1, wherein:
   the second signal pipeline further comprises:
      a first pipeline multiplexer configured to receive the output from the first track-and-hold element and the second track-and-hold element; and
      a second pipeline multiplexer configured to receive the output from the first track-and-hold element and the second track-and-hold element;
   the first pipeline multiplexer of the second signal pipeline is configured to be driven by the output of the first track-and-hold element of the first signal pipeline;
   the second pipeline multiplexer of the second signal pipeline is configured to be driven by the output of the second track-and-hold element of the first signal pipeline;
   the first multiplexer is configured to receive outputs from the third track-and-hold element of the first signal pipeline and the fourth track-and-hold element of the first signal pipeline and produce a decision bit.

8. A communication system comprising:
   a first signal pipeline comprising:
      a first comparator;

a second comparator;
a first track-and-hold element configured to receive the output from the first comparator, the first track-and-hold element configured to be driven by a first clock signal;
a second track-and-hold element configured to receive the output from the second comparator, the second track-and-hold element configured to be driven by the first clock signal;
a third track-and-hold element configured to receive the output from the first track-and-hold element; and
a fourth track-and-hold element configured to receive the output from the second track-and-hold element; and
a second signal pipeline comprising:
a first comparator;
a second comparator;
a first track-and-hold element configured to receive the output from the first comparator, the first track-and-hold element configured to be driven by a second clock signal; and
a second track-and-hold element configured to receive the output from the second comparator, the second track-and-hold element configured to be driven by the second clock signal; and
a first multiplexer configured to produce one or more feedback equalized bits.

9. The communication system of claim 8, wherein:
the first comparator of the second signal pipeline is configured to receive the output from the first comparator of the first signal pipeline; and
the second comparator of the second signal pipeline is configured to receive the output from the second comparator of the first signal pipeline.

10. The communication system of claim 9, wherein:
the output from the first comparator of the first signal pipeline is scaled by a tap coefficient before it is received by the first comparator of the second signal pipeline; and
the output from the second comparator of the first signal pipeline is scaled by a tap coefficient before it is received by the second comparator of the second signal pipeline.

11. The communication system of claim 9, further comprising:
a third signal pipeline comprising:
a first comparator;
a second comparator;
a first track-and-hold element configured to receive the output from the first comparator, the first track-and-hold element configured to be driven by a third clock signal; and
a second track-and-hold element configured to receive the output from the second comparator, the second track-and-hold element configured to be driven by the third clock signal,
wherein:
the first signal pipeline further comprises:
a fifth track-and-hold element configured to receive the output from the third track-and-hold element; and
a sixth track-and-hold element configured to receive the output from the fourth track-and-hold element;
the second signal pipeline further comprises:
a third track-and-hold element configured to receive the output from the first track-and-hold element; and
a fourth track-and-hold element configured to receive the output from the second track-and-hold element.

12. The communication system of claim 11, wherein:
the first comparator of the third signal pipeline is configured to receive the output from the first comparator of the second signal pipeline; and
the second comparator of the third signal pipeline is configured to receive the output from the second comparator of the second signal pipeline.

13. The communication system of claim 12, wherein the first clock signal, the second clock signal and the third clock signal are substantially similar.

14. The communication system of claim 8, wherein:
the second signal pipeline further comprises:
a first pipeline multiplexer configured to receive the output from the first track-and-hold element and the second track-and-hold element; and
a second pipeline multiplexer configured to receive the output from the first track-and-hold element and the second track-and-hold element;
the first pipeline multiplexer of the second signal pipeline is configured to be driven by the output of the first track-and-hold element of the first signal pipeline;
the second pipeline multiplexer of the second signal pipeline is configured to be driven by the output of the second track-and-hold element of the first signal pipeline;
the first multiplexer is configured to receive outputs from the third track-and-hold element of the first signal pipeline and the fourth track-and-hold element of the first signal pipeline and produce a decision bit.

15. A method for decision feedback equalization comprising:
receiving a first signal pulse;
pre-computing a first possible post-decision state and second possible post decision state of the first signal pulse;
delaying the first possible post-decision state and the second possible post decision state of the first signal pulse for at least one unit interval;
receiving a second signal pulse;
pre-computing a first possible post-decision state and a second possible post decision state of the second signal pulse;
simultaneously determining a final decision state of the first signal pulse and a final decision state of the second signal pulse.

16. The method of claim 15, further comprising:
selecting a first pipeline multiplexed decision from the first possible post-decision state and the second possible post decision state of the second signal pulse based on the first possible decision state of the first signal pulse; and
selecting a second pipeline multiplexed decision from the first possible post-decision state and the second possible post decision state of the second signal pulse based on the second possible decision state of the first signal pulse.

17. The method of claim 16, further comprising:
delaying the first pipeline multiplexed decision for at least one time interval;
delaying the second pipeline multiplexed decision for at least one time interval; and
delaying the first possible post-decision state and the second possible post decision state of the first signal pulse for at least two unit intervals.

18. The method of claim 15, wherein pre-computing the first possible post-decision state and the second possible post decision state of the second signal pulse comprises comparing the second signal pulse to the first possible decision state of the first signal pulse and the second possible signal state of the first signal pulse.

19. The method of claim 18, further comprising:
receiving a third signal pulse;
pre-computing a first possible post-decision state and a second possible post decision state of the third signal pulse;
simultaneously determining a final decision state of the first signal pulse, a final decision state of the second signal pulse and a final decision state of the third signal pulse.

20. The method of claim 19, further comprising:
selecting a third pipeline multiplexed decision from the first possible post-decision state and the second possible post decision state of the third signal pulse based on the first possible decision state of the second signal pulse; and
selecting a second pipeline multiplexed decision from the first possible post-decision state and the second possible post decision state of the third signal pulse based on the second possible decision state of the second signal pulse;
delaying the first pipeline multiplexed decision associated with the third signal pulse for at least one time interval;
delaying the second pipeline multiplexed decision associated with the third signal pulse for at least one time interval; and
delaying the first possible post-decision state and the second possible post decision state of the first signal pulse for at least three unit intervals.

* * * * *